UNITED STATES PATENT OFFICE.

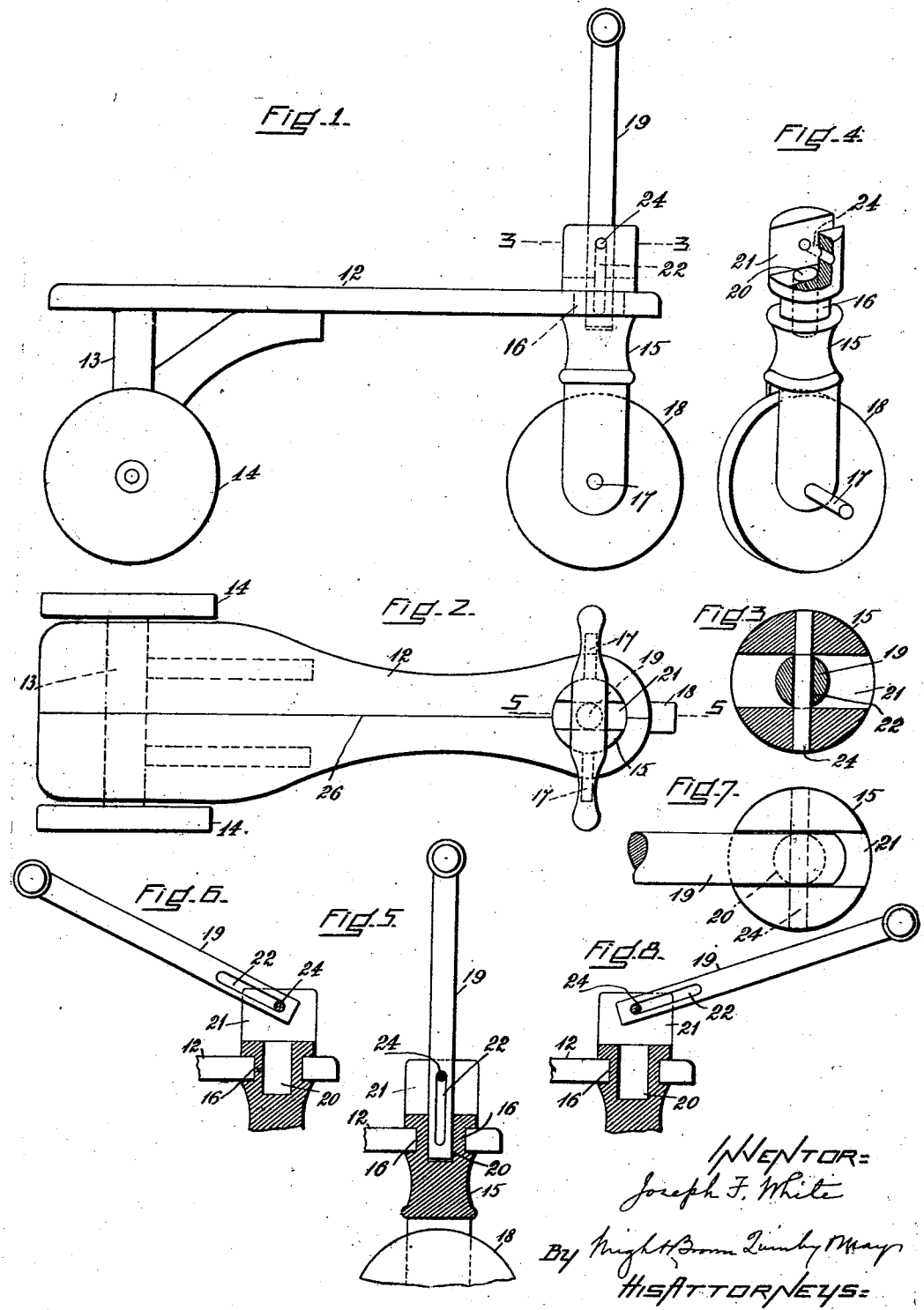

JOSEPH F. WHITE, OF BROOKLINE, MASSACHUSETTS; MARY FILES WHITE ADMINISTRATRIX OF SAID JOSEPH F. WHITE, DECEASED.

CHILD'S VEHICLE.

1,297,282.　　　　Specification of Letters Patent.　　Patented Mar. 11, 1919.

Application filed April 13, 1918.　Serial No. 228,463.

*To all whom it may concern:*

Be it known that I, JOSEPH F. WHITE, a citizen of the United States, residing at Brookline, in the county of Norfolk and State of Massachusetts, have invented new and useful Improvements in Children's Vehicles, of which the following is a specification.

This invention relates to a vehicle adapted to be moved by the alternate thrust of the feet of the rider on a floor, the vehicle being intended to be used by small children, and including a body member which the rider bestrides, and provided with a traveling rear support including a pair of traveling members, such as wheels, or runners, and a dirigible traveling forward support including an upright steering post journaled in the forward portion of the body member, and a traveling member, such as a single wheel, or runner, connected with the post.

The invention is embodied in certain improvements in the dirigible support, said support being provided with an adjustable rod which may be used in either of three positions, viz., in axial alinement with the post as a steering-rod, inclined backwardly from the post as a steering tiller, and inclined forward from the post as a handle whereby the vehicle may be drawn.

Of the accompanying drawings forming a part of this specification,—

Figure 1 is a side view of a vehicle embodying the invention.

Fig. 2 is a plan view of the same.

Fig. 3 is an enlarged section on line 3—3 of Fig. 1.

Fig. 4 is a perspective view of a portion of the steering post, a part being broken away.

Fig. 5 is a section on line 5—5 of Fig. 2.

Fig. 6 is a view similar to Fig. 5, showing the steering rod inclined backward to serve as a tiller.

Fig. 7 is a top plan view of the steering post, and includes a side view of a portion of the rod in the position shown by Fig. 6.

Fig. 8 is a view similar to Fig. 5, showing the rod inclined forward to serve as a handle or tongue.

The same reference characters indicate the same parts in all of the figures.

In the drawings, 12 represents the body member, which is elongated, its rear portion being widened and serving as a seat. The rear portion is provided with a suitable traveling rear support, which as here shown, includes a bolster 13, and a pair of traveling members 14, here shown as wheels connected with the bolster to rotate. Runners may be employed instead of wheels, if desired.

15 represents a steering post, which is journaled in a bearing in the forward end portion of the body member 12, as best shown by Figs. 5, 6, and 8, the post being provided with a reduced journal portion 16. The lower end of the post is bifurcated, and provided with a transverse pin 17, which may constitute the axle of a steering front wheel 18, although, if desired, a runner may be substituted for this wheel.

19 represents a steering rod which is movably engaged with the post 15, and is adjustable to permit the use of the rod as a steering member, which may be either coaxial with the post, as shown by Figs. 1 and 5, or inclined rearward to constitute a tiller, as shown by Fig. 6, or forward to constitute a tongue as shown by Fig. 8, whereby the vehicle may be drawn, means being provided for imparting a turning movement from the rod to the post when the rod is in any position to which it may be adjusted, the post and rod being provided with complemental stop members adapted to prevent separation of the rod from the post.

In the preferred embodiment of the invention here shown, the post, which projects above the body member 12, is provided in its upper portion with a longitudinal socket 20, adapted to receive a closely fitting lower end portion of the rod 19. In the post above the socket is formed a transverse slot 21, which communicates with the socket and is open at the upper end, and at the front and rear sides of the post. The lower end portion of the rod is provided with a longitudinal slot 22, closed at both ends. In assembling the post and rod, the post is inserted in an upright position in the socket 20, and a transverse pin 24 is inserted in the post, said pin passing through the transverse slot 21 of the post and through the longitudinal slot 22 of the rod. The arrangement is such that when the rod is in an upright position, the pin 24 is at or near the upper end of the longitudinal slot 22. The length of said slot is such that the rod may be withdrawn from the socket 20, and inclined either backward, as shown by Fig. 6, to serve as a tiller, or forward, as shown by Fig. 8, to serve as a tongue. When the rod is in either of the inclined positions described, the lower end of the longitudinal slot 22 abuts against the pin, said end and the pin constituting complemental stop members, preventing the separation of the rod from the post. The thickness of the rod is such that it has a close sliding fit on the sides of the transverse slot 21, so that when the rod is inclined, its opposite portions have elongated bearings on the sides of the slot 21, permitting the effective use of the rod, either as a tiller, or as a tongue, a horizontal swinging movement of the rod in either direction imparting a turning movement to the post.

When the rod is adjusted as shown by Fig. 6, the rider is enabled to steer the vehicle while leaning backward. When the rod is adjusted as shown by Fig. 8, the vehicle may be conveniently drawn, like a hand cart. When the rod is upright, and coaxial with the post, it has a practically rigid connection with the latter through the pin 24, and the sides of the slot 22, the rod serving as an upright steering rod.

It is obvious that the rod may be swung downward and rearward into contact with the body 12, when it is desired to fold the vehicle for storage or shipment.

I prefer to make the body 12 in two sections, the edges of which are abutted together on the line 26 (Fig. 2), a portion of the post bearing being formed in each section. This construction enables the post to be conveniently engaged with the body member, the sections of which are suitably united after assemblage, by any suitable means.

As indicated by Fig. 4, and by dotted lines in Fig. 2, the pin 17 is elongated and projects from opposite sides of the bifurcated portion of the post, so that the end portions of the pin constitute foot rests and means for steering by the feet of the rider.

It will be seen that the connection between the post and rod afforded by the slot 22 and pin 24, constitutes a slot-and-pin connection between the post and rod adapted to impart a turning movement from the rod to the post, when the rod and post are coaxial, and permitting independent swinging and limited endwise movements of the rod.

It will also be seen that the sides of the slot 21 and the sides of the rod contacting therewith, constitute reciprocal bearing faces on the post and rod, whereby a turning movement will be imparted from the rod to the post when the rod is inclined.

I claim:

1. A vehicle of the character stated, comprising an elongated body member having traveling supporting means at its rear portion, and a bearing at its forward portion, and dirigible traveling supporting means engaged with the forward portion of the body member, said dirigible means including an upright steering post having a journal portion in said bearing, and a rod which is movably engaged with the post and is adjustable relatively thereto, to permit the use of the rod as a steering member, either coaxial with the post, or inclined rearward to constitute a tiller, or forward to constitute a tongue, means being provided for imparting a turning movement from the rod to the post, when the rod is in any position to which it may be adjusted, said means including a slot-and-pin connection between the post and rod adapted to impart a turning movement from the rod to the post when the rod and post are coaxial, and permitting independent swinging and limited endwise movements of the rod, and reciprocal bearing faces on the post and rod, whereby a turning movement may be imparted from the rod to the post when the rod is inclined.

2. A vehicle of the character stated, comprising an elongated body member having traveling supporting means at its rear portion, and dirigible traveling supporting means engaged with the forward portion of the body member, said dirigible means including an upright steering post journaled in the body, and provided with a longitudinal socket, and with a transverse slot communicating with said socket, a rod formed to enter said socket, and oscillate in said transverse slot and provided with a longitudinal slot, and a pin engaged with the post and extending through the transverse slot thereof and through the longitudinal slot of the rod, the pin and longitudinal slot permitting limited longitudinal movements of the rod, whereby the rod may be inserted in the socket and maintained thereby coaxial with the post, and withdrawn from the socket and turned on the pin to an inclined position permitting its use either as a tiller, or as a tongue, the rod, when inclined, having elongated bearings on the sides of the transverse slot.

In testimony whereof I have affixed my signature.

JOSEPH F. WHITE.